US010031389B2

(12) United States Patent
Jung et al.

(10) Patent No.: US 10,031,389 B2
(45) Date of Patent: Jul. 24, 2018

(54) LIQUID CRYSTAL DISPLAY

(71) Applicant: SAMSUNG DISPLAY CO., LTD., Yongin-si, Gyeonggi-do (KR)

(72) Inventors: Jae Hoon Jung, Anyang-si (KR); Hoon Kim, Ansan-si (KR); Heung Shik Park, Seoul (KR); Ki Chul Shin, Seongnam-si (KR); Ji Phyo Hong, Pyeongtaek-si (KR)

(73) Assignee: Samsung Display Co. Ltd. (KR)

( * ) Notice: Subject to any disclaimer, the term of this patent is extended or adjusted under 35 U.S.C. 154(b) by 328 days.

(21) Appl. No.: 14/849,444

(22) Filed: Sep. 9, 2015

(65) Prior Publication Data

US 2016/0202585 A1    Jul. 14, 2016

(30) Foreign Application Priority Data

Jan. 8, 2015    (KR) .......................... 10-2015-0002961

(51) Int. Cl.
*G02F 1/13*    (2006.01)
*G02F 1/1362*    (2006.01)
(Continued)

(52) U.S. Cl.
CPC ...... *G02F 1/136286* (2013.01); *G02F 1/1368* (2013.01); *G02F 1/13624* (2013.01); *G02F 1/134309* (2013.01); *G02F 1/136209* (2013.01); *G02F 1/136213* (2013.01); *G02F 1/1393* (2013.01); *G02F 2001/134345* (2013.01)

(58) Field of Classification Search
CPC ......... G02F 1/134309; G02F 1/136209; G02F 1/136286; G02F 1/1368; G02F 1/13624; G02F 1/1393; G02F 2001/134345
See application file for complete search history.

(56) References Cited

U.S. PATENT DOCUMENTS 7,955,155 B2 *    6/2011    Tremblay ............. A63H 33/046
                                                              446/85
2004/0119934 A1 *    6/2004    Park .................. G02F 1/133516
                                                              349/187

(Continued)

FOREIGN PATENT DOCUMENTS

JP    2004037853 A    2/2004
JP    2013092785 A    5/2013
(Continued)

*Primary Examiner* — Ariel Balaoing
(74) *Attorney, Agent, or Firm* — Innovation Counsel LLP

(57) ABSTRACT

A liquid crystal display includes: a substrate; a gate line, a data line, a first storage electrode line, and a second storage electrode line positioned on the substrate; a first thin film transistor, a second thin film transistor, and a third thin film transistor connected to the gate line and the data line; a fourth thin film transistor connected to the gate line, the third thin film transistor, and the second storage electrode line; a first subpixel electrode connected to the first thin film transistor; a second subpixel electrode connected to the second thin film transistor; a third subpixel electrode connected to the third thin film transistor; and a storage electrode connected to the first storage electrode line and overlapping the first subpixel electrode. Different voltages are applied to the three subpixels to improve lateral visibility of the liquid crystal display.

20 Claims, 11 Drawing Sheets

(51) Int. Cl.
    *G02F 1/1343*     (2006.01)
    *G02F 1/1368*     (2006.01)
    *G02F 1/139*     (2006.01)

(56) References Cited

U.S. PATENT DOCUMENTS

| | | | |
|---|---|---|---|
| 2007/0024786 A1* | 2/2007 | Tanaka | G02F 1/133707 349/139 |
| 2007/0159587 A1* | 7/2007 | Kim | G02F 1/133707 349/144 |
| 2008/0129937 A1* | 6/2008 | Lin | G02F 1/133512 349/110 |
| 2008/0136985 A1* | 6/2008 | Hsieh | G02F 1/136213 349/39 |
| 2008/0284931 A1* | 11/2008 | Kimura | G02F 1/13624 349/39 |
| 2009/0015744 A1* | 1/2009 | Sekine | G09G 3/3659 349/39 |
| 2012/0224128 A1* | 9/2012 | Jung | G02F 1/134309 349/129 |
| 2014/0211142 A1 | 7/2014 | Kim et al. | |

FOREIGN PATENT DOCUMENTS

| | | |
|---|---|---|
| KR | 1020050060730 A | 6/2005 |
| KR | 100921450 | 10/2009 |
| KR | 1020140097905 A | 8/2014 |

\* cited by examiner

LIQUID CRYSTAL DISPLAY

CROSS-REFERENCE TO RELATED APPLICATION

This application claims priority to and the benefit of Korean Patent Application No. 10-2015-0002961 filed in the Korean Intellectual Property Office on Jan. 8, 2015, the disclosure of which is incorporated herein by reference in its entirety.

BACKGROUND (a) Technical Field

The present disclosure relates to a liquid crystal display (LCD). More particularly, the present disclosure relates to a liquid crystal display improving lateral visibility.

(b) Description of the Related Art

A liquid crystal display includes two display panels. Field generating electrodes such as a pixel electrode and a common electrode are formed on the two display panels, and a liquid crystal layer is interposed between the two display panels. Voltages applied to the field generating electrodes generate an electrical field in the liquid crystal layer and, change the orientations of liquid crystal molecules of the liquid crystal layer and control polarization of incident light to display an image. The liquid crystal display also includes switching elements connected to the respective pixel electrodes, and a plurality of signal lines such as gate lines and data lines for controlling the switching elements and applying voltages to the pixel electrodes.

Among various types of LCDs, a vertical alignment mode LCD arranges major axes of liquid crystal molecules to be perpendicular to the display panel in a state in which an electric field is not applied. The vertical alignment mode LCD has been widely used due to its high contrast ratio and wide reference viewing angle. Here, the reference viewing angle implies a viewing angle that is 1:10 in contrast ratio, or a critical angle of gray-to-gray luminance reversion.

However, the vertical alignment mode LCD has a problem that the lateral visibility is decreased. That is, the screen viewing on a side is different from the screen viewing at the front.

The above information disclosed in the Background section is only for enhancement of understanding of the background of the present disclosure and therefore it may contain information that does not form the prior art that is already known to a person of ordinary skill in the art.

SUMMARY

The present disclosure provides a liquid crystal display with improved lateral visibility.

A liquid crystal display according to an exemplary embodiment of the present disclosure includes: a substrate; a gate line, a data line, a first storage electrode line, and a second storage electrode line positioned on the substrate; a first thin film transistor, a second thin film transistor, and a third thin film transistor connected to the gate line and the data line; a fourth thin film transistor connected to the gate line, the third thin film transistor, and the second storage electrode line; a first subpixel electrode connected to the first thin film transistor; a second subpixel electrode connected to the second thin film transistor; a third subpixel electrode connected to the third thin film transistor; and a storage electrode connected to the first storage electrode line and overlapping the first subpixel electrode.

A first data voltage applied to the first subpixel electrode may be higher than a second data voltage applied to the second subpixel electrode, and the second data voltage applied to the second subpixel electrode may be higher than a third data voltage applied to the third subpixel electrode.

The first storage electrode line may be alternately applied with a first voltage and a second voltage higher than the first voltage.

After the gate line is applied with a gate-on voltage, the first storage electrode line may be applied with the second voltage.

When the first storage electrode line is applied with the second voltage, the first data voltage applied to the first subpixel electrode may be increased.

The second storage electrode line may be applied with a constant voltage.

The gate line and the data line may be formed at different layers and are crossed.

The first storage electrode line may be positioned at a same layer as the gate line.

The first storage electrode line may extend in a direction parallel to the gate line.

The first subpixel electrode may include a crossed-shape stem including a transverse stem and a longitudinal stem, and a minute branch extending from the crossed-shape stem, and the first storage electrode line may overlap the transverse stem of the first subpixel electrode.

The second storage electrode line may be positioned at a same layer as the data line.

The second storage electrode line may extend in a direction parallel to the data line.

The first subpixel electrode may include a crossed-shaped stem including a transverse stem and a longitudinal stem, and a minute branch extending from the crossed-shape stem, and the second storage electrode line may overlap the longitudinal stem of the first subpixel electrode.

The second storage electrode line may not overlap the second subpixel electrode.

The third subpixel electrode may include a crossed-shape stem including a transverse stem and a longitudinal stem, and a minute branch extending from the stem, and the second storage electrode line may overlap the longitudinal stem of the third subpixel electrode.

The second subpixel electrode may include a first part and a second part respectively positioned at both sides with respect to the second storage electrode line.

The first part and the second part of the second subpixel electrode may respectively include a transverse stem, an outer stem, and a minute branch extending from the transverse stem and the outer stem.

The first part and the second part may be symmetrical; with respect to the second storage electrode line.

The liquid crystal display may further include a light blocking member positioned between the second subpixel electrode and the third subpixel electrode, and the light blocking member may be positioned at a same layer as the gate line.

The liquid crystal display may further include a light blocking member positioned between the second subpixel electrode and the third subpixel electrode, and the light blocking member may be positioned at a same layer as the data line and is connected to the second storage electrode line.

The liquid crystal display according to an exemplary embodiment of the present disclosure has effects as follows.

In the liquid crystal display, according to an exemplary embodiment of the present disclosure, one pixel is divided into three subpixels, and different voltages are applied to the three subpixels to improve lateral visibility.

DETAILED DESCRIPTION OF THE EMBODIMENTS

Figure 1:
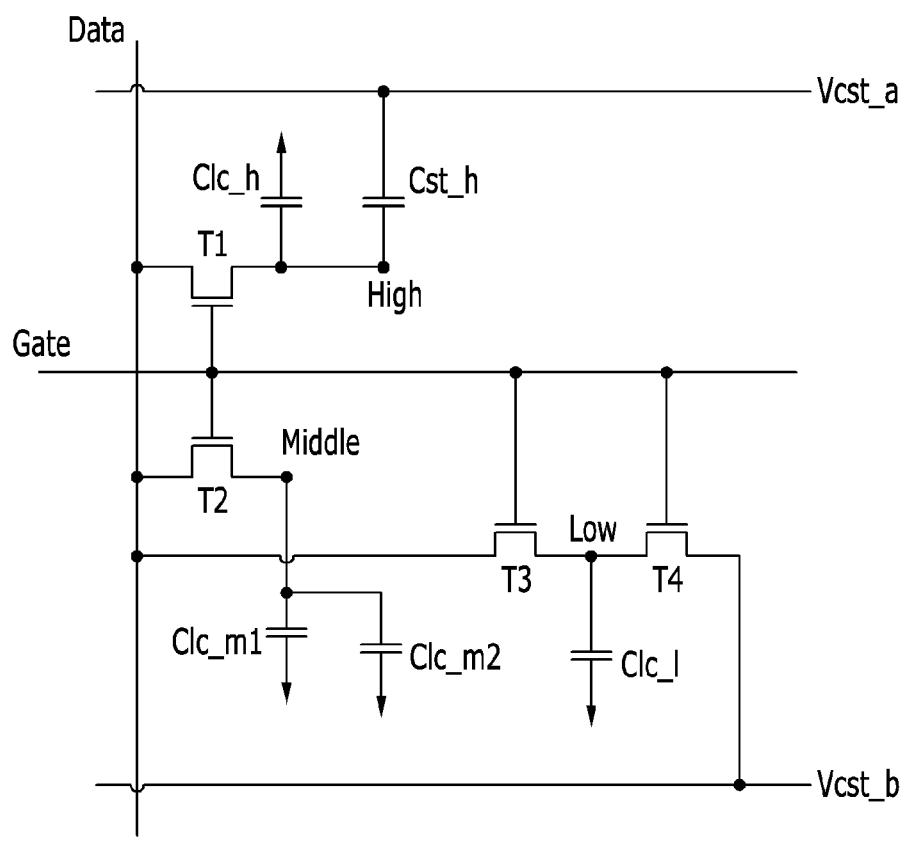
FIG. 1 is a circuit diagram of one pixel of a liquid crystal display, according to an exemplary embodiment of the present disclosure.

The present disclosure will be described more fully hereinafter with reference to the accompanying drawings, in which exemplary embodiments of the present disclosure are shown. As those skilled in the art would realize, the described embodiments may be modified in various different ways, without departing from the spirit or scope of the present disclosure.

In the drawings, the thickness of layers, films, panels, regions, etc., is exaggerated for clarity. Like reference numerals designate like elements throughout the specification. It will be understood that when an element such as a layer, film, region, or substrate is referred to as being "on" another element, it can be directly on the other element, or one or more intervening elements may be present. In contrast, when an element is referred to as being "directly on" another element, there may be no intervening elements present.

First, a liquid crystal display, according to an exemplary embodiment of the present disclosure, will be described with reference to FIG. 1. FIG. 1 is a circuit diagram of one pixel of a liquid crystal display, according to an exemplary embodiment of the present disclosure. The liquid crystal display includes a plurality of signal lines such as Gate, Data, Vcst_a, and Vcst_b, and a plurality of pixels PX that are connected to the signal lines. For the purpose of illustrative convenience, only one of each of the signal lines Gate, Data, Vcst_a, and Vcst_b and one pixel PX are shown.

The signal lines include a gate line Gate transmitting a gate signal (also referred to as "a scanning signal"), a data line Data transmitting a data voltage, a first storage electrode line Vcst_a alternately applying two different voltages, and a second storage electrode line Vcst_b applying a predetermined voltage.

A first thin film transistor T1, a second thin film transistor T2, and a third thin film transistor T3 are connected to the same gate line Gate and the same data line Data. Further, a fourth thin film transistor T4 that is connected to the gate line Gate, the third thin film transistor T3, and the second storage electrode line Vcst_b is formed.

Each pixel PX includes a first subpixel PXa, a second subpixel PXb, and a third subpixel PXc. In the first subpixel PXa, a first liquid crystal capacitor Clc_h and a storage capacitor Cst_h are connected to the first thin film transistor T1. The storage capacitor Cst_h is connected to the first storage electrode line Vcst_a. In the second subpixel PXb, two second liquid crystal capacitors Clc_m1 and Clc_m2 are connected to the second thin film transistor T2. In the third subpixel PXc, a third liquid crystal capacitor Clc_l is connected to the third thin film transistor T3.

The first thin film transistor T1 includes a first terminal connected to the gate line Gate, a second terminal connected to the data line Data, and a third terminal connected to the first liquid crystal capacitor Clc_h. The second thin film transistor T2 includes a first terminal connected to the gate line Gate, a second terminal connected to the data line Data, and a third terminal connected to the second liquid crystal capacitors Clc_m1 and Clc_m2. The third thin film transistor T3 includes a first terminal connected to the gate line Gate, a second terminal connected to the data line Data, and a third terminal connected to the third liquid crystal capacitor Clc_l. The fourth thin film transistor T4 includes a first terminal connected to the gate line Gate, a second terminal connected to the third terminal of the third thin film transistor T3, and a third terminal connected to the second storage electrode line Vcst_b.

Figure 2:
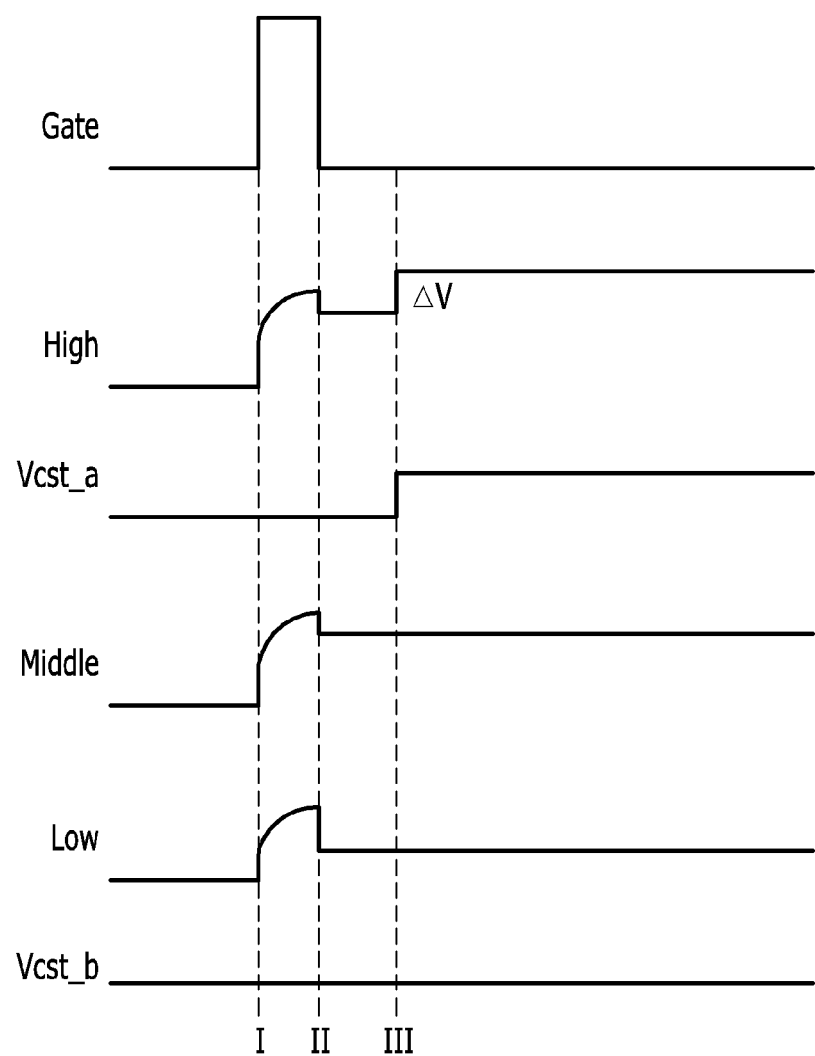
FIG. 2 is a timing diagram showing signals applied to a liquid crystal display, according to an exemplary embodiment of the present disclosure.

An operation of the liquid crystal display, according to an exemplary embodiment of the present disclosure, will be described with reference to FIG. 2. FIG. 2 is a timing diagram showing signals applied to a liquid crystal display, according to an exemplary embodiment of the present disclosure. It is understood that the timing diagram is not drawn to scale, therefore the intervals between the times I, II, and III and the signal levels can be varied without deviating from the scope of the present disclosure.

Initially, at time I, when the gate line Gate is applied with a gate-on voltage, the first thin film transistor T1, the second thin film transistor T2, and the third thin film transistor T3 that are connected to the gate line Gate are turned on, and the first liquid crystal capacitor Clc_h, the second liquid crystal capacitors Clc_m1 and Clc_m2, and the third liquid crystal capacitor Clc_l are charged by the data voltage transmitted through the data line Data. The first storage electrode line Vcst_a is applied with a first voltage.

In this case, the first liquid crystal capacitor Clc_h and the second liquid crystal capacitors Clc_m1 and Clc_m2 are charged with the same voltage. The fourth thin film transistor T4 is in a turn-on state such that a portion of the voltage charged to the third liquid crystal capacitor Clc_l is discharged into the second storage electrode line Vcst_b. Accordingly, although the data voltages that are transmitted to the second subpixel PXb and the third subpixel PXc through the data line Data are the same, the voltage charged to the second liquid crystal capacitors Clc_m1 and Clc_m2 is different from the voltage charged to the third liquid crystal capacitor Clc_l. In one embodiment, the voltage charged to the third liquid crystal capacitor Clc_l is lower than the voltage charged to the second liquid crystal capacitors Clc_m1 and Clc_m2.

At time II, when the gate line Gate is applied with a gate-off voltage, a kickback voltage due to a parasitic capacitance is generated in the first subpixel PXa, the second subpixel PXb, and the third subpixel PXc, and the charge voltages of the first liquid crystal capacitor Clc_h, the second liquid crystal capacitors Clc_m1 and Clc_m2, and the third liquid crystal capacitor Clc_l are decreased.

At time III, the first storage electrode line Vcst_a is applied with a second voltage that is higher than the first voltage. That is, when the gate line Gate is applied with the gate-on voltage, the first storage electrode line Vcst_a is applied with the first voltage, and after the gate line Gate is applied with the gate-off voltage, the first storage electrode line Vcst_a is applied with the second voltage that is higher than the first voltage. In one embodiment, a difference between the first voltage and the second voltage is about 3 V.

When the first storage electrode line Vcst_a is applied with the second voltage (at time III), the charge voltage of the first liquid crystal capacitor Clc_h is increased. In one embodiment, an increasing voltage Vup of the first liquid crystal capacitor Clc_h is determined by Equation 1. As the capacitance of the storage capacitor Cst_h increases, the increasing voltage Vup of the first liquid crystal capacitor Clc_h is increased. Also, as the voltage difference ΔV between the first voltage and the second voltage applied to the first storage electrode line Vcst_a increases, the increasing voltage Vup of the first liquid crystal capacitor Clc_h is increased.

$$Vup = \frac{Csth}{Clch + Csth + Cetc} \times \Delta V, \qquad \text{[Equation 1]}$$

wherein Vup is the increasing voltage of the first liquid crystal capacitor, and Clch is the capacitance of the first liquid crystal capacitor. Csth is the capacitance of the first storage capacitor, and Cetc is the parasitic capacitance. ΔV is the difference between the first voltage and the second voltage.

The voltage charged to the first liquid crystal capacitor Clc_h is higher than the voltage charged to the second liquid crystal capacitors Clc_m1 and Clc_m2 by the increasing voltage Vup of the first liquid crystal capacitor Clc_h. Accordingly, the charge voltage of the first liquid crystal capacitor Clc_h is higher than the charge voltage of the second liquid crystal capacitors Clc_m1 and Clc_m2, and the charge voltage of the second liquid crystal capacitors Clc_m1 and Clc_m2 is higher than the charge voltage of the third liquid crystal capacitor Clc_l. As described above, by applying the different voltages to the subpixels PXa, PXb, and PXc of the same pixel PX, the lateral visibility may be improved. For example, the image viewing on a side is improved similar to the image viewing at the front.

Figure 3:
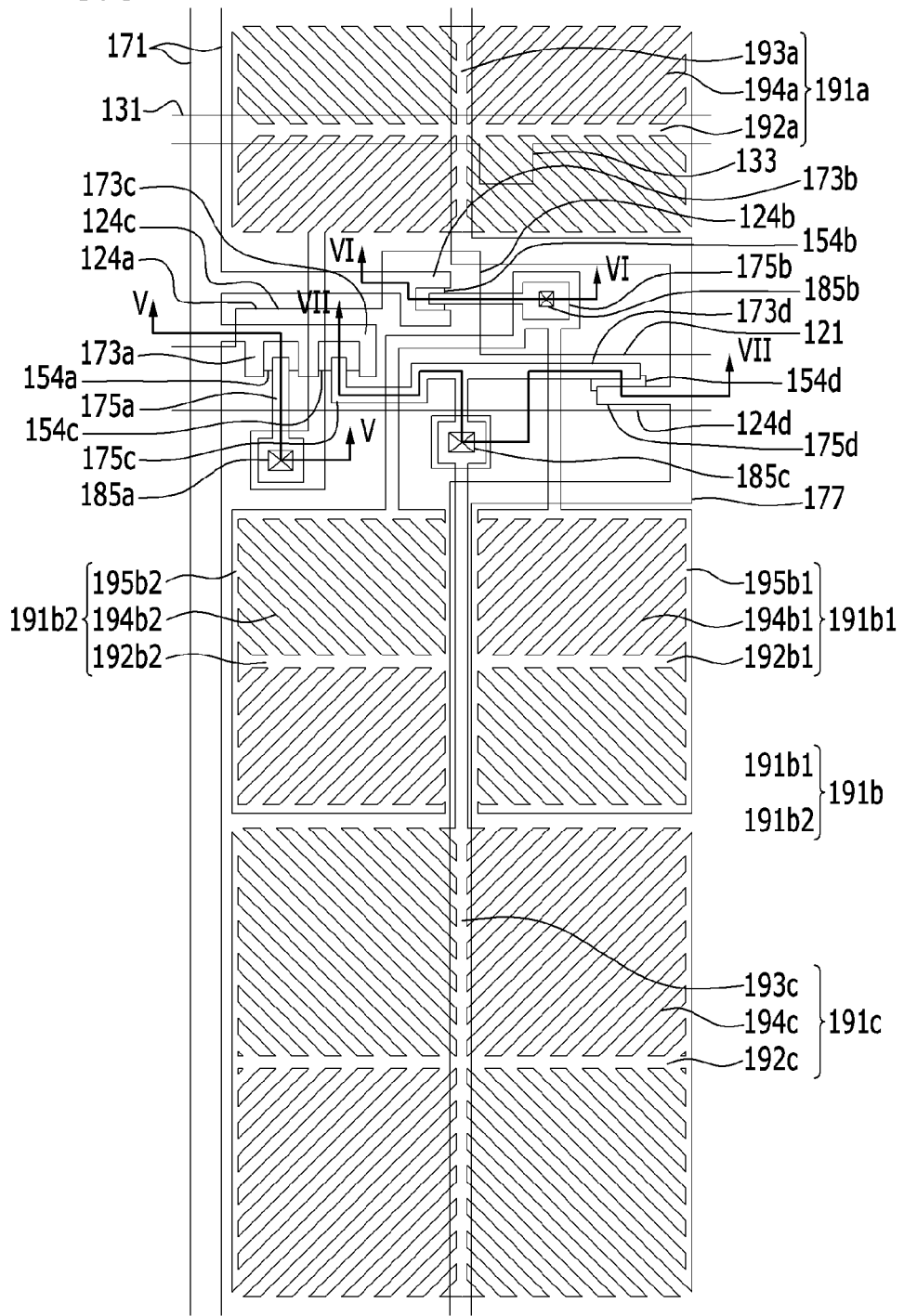
FIG. 3 is a top plan view of a liquid crystal display, according to an exemplary embodiment of the present disclosure.
Figure 4:
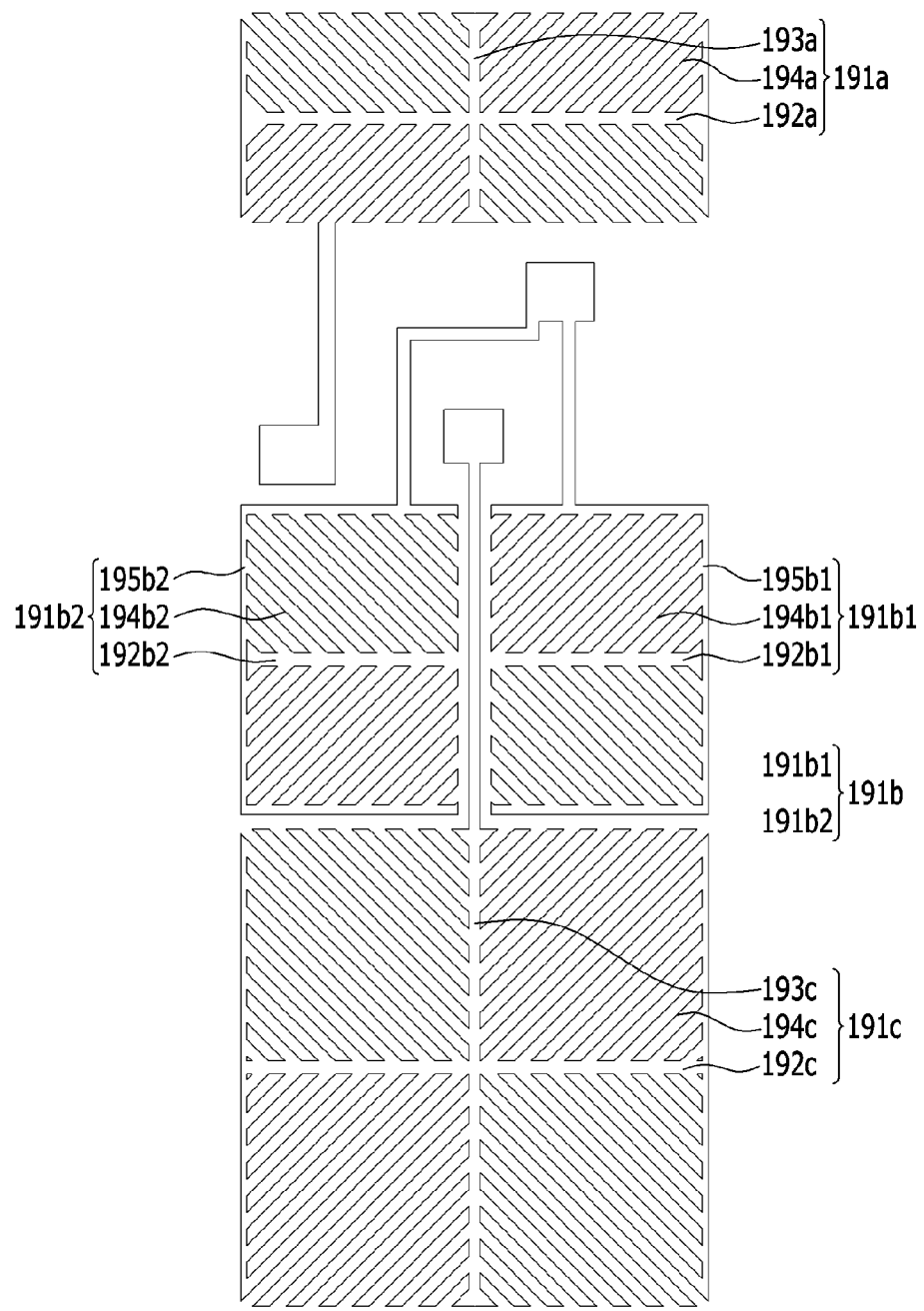
FIG. 4 is a top plan view partially showing constituent elements of FIG. 3.
Figure 5:
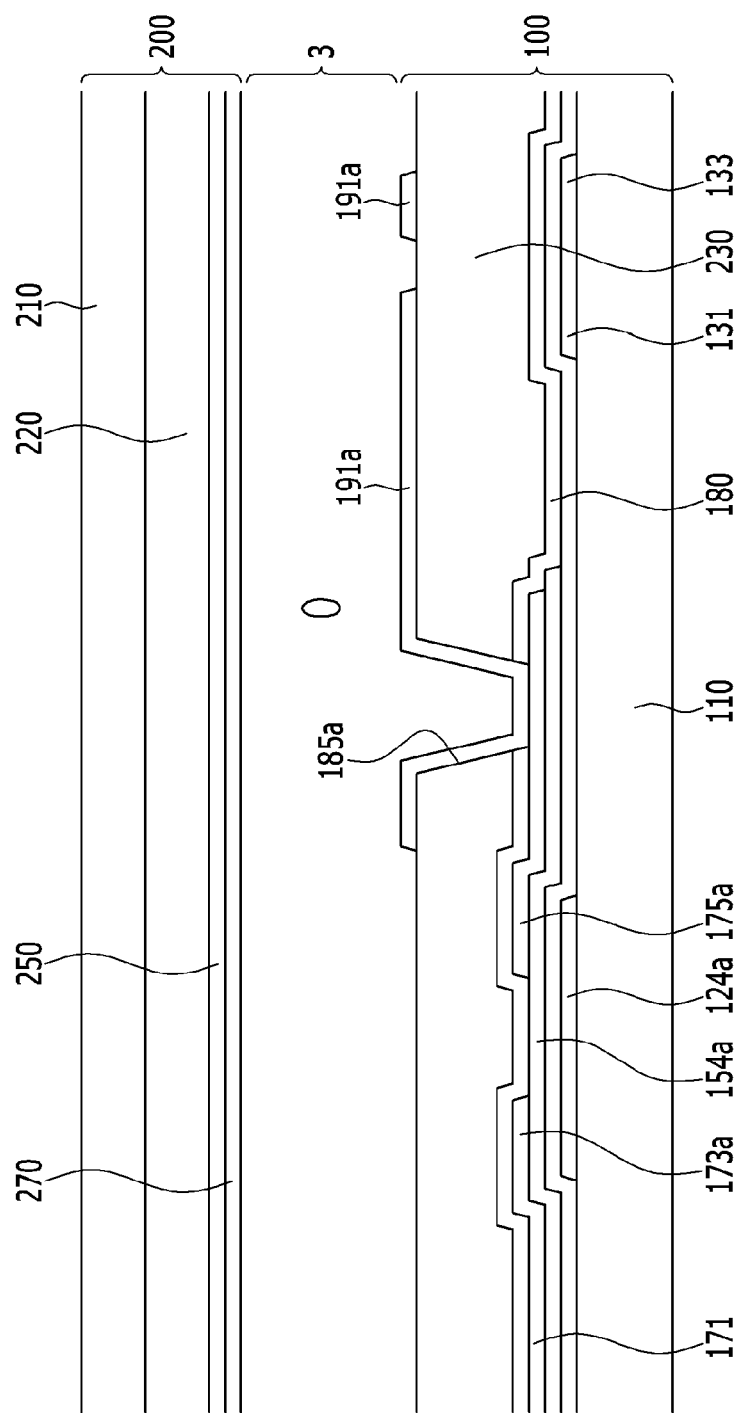
FIG. 5 is a cross-sectional view of a liquid crystal display, according to an exemplary embodiment of the present disclosure, taken along a line V-V of FIG. 3.
Figure 6:
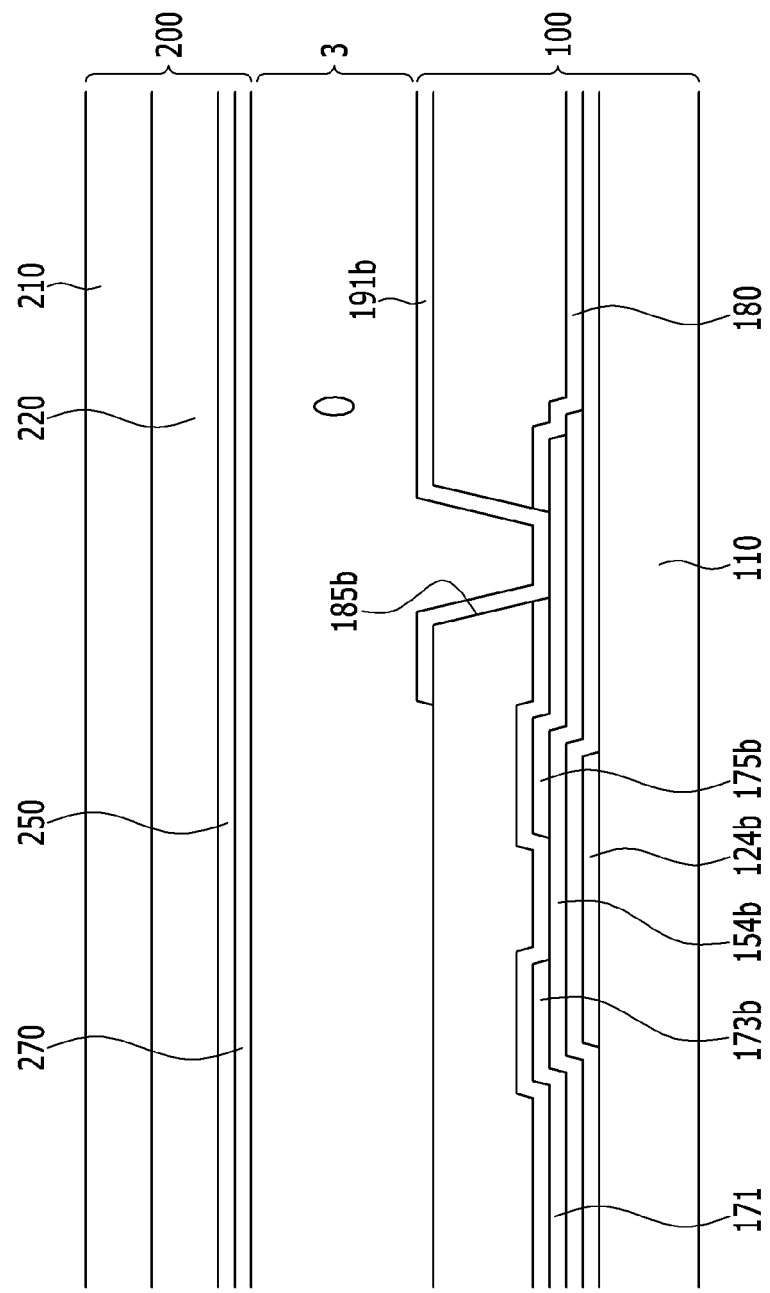
FIG. 6 is a cross-sectional view of a liquid crystal display, according to an exemplary embodiment of the present disclosure, taken along a line VI-VI of FIG. 3.
Figure 7:
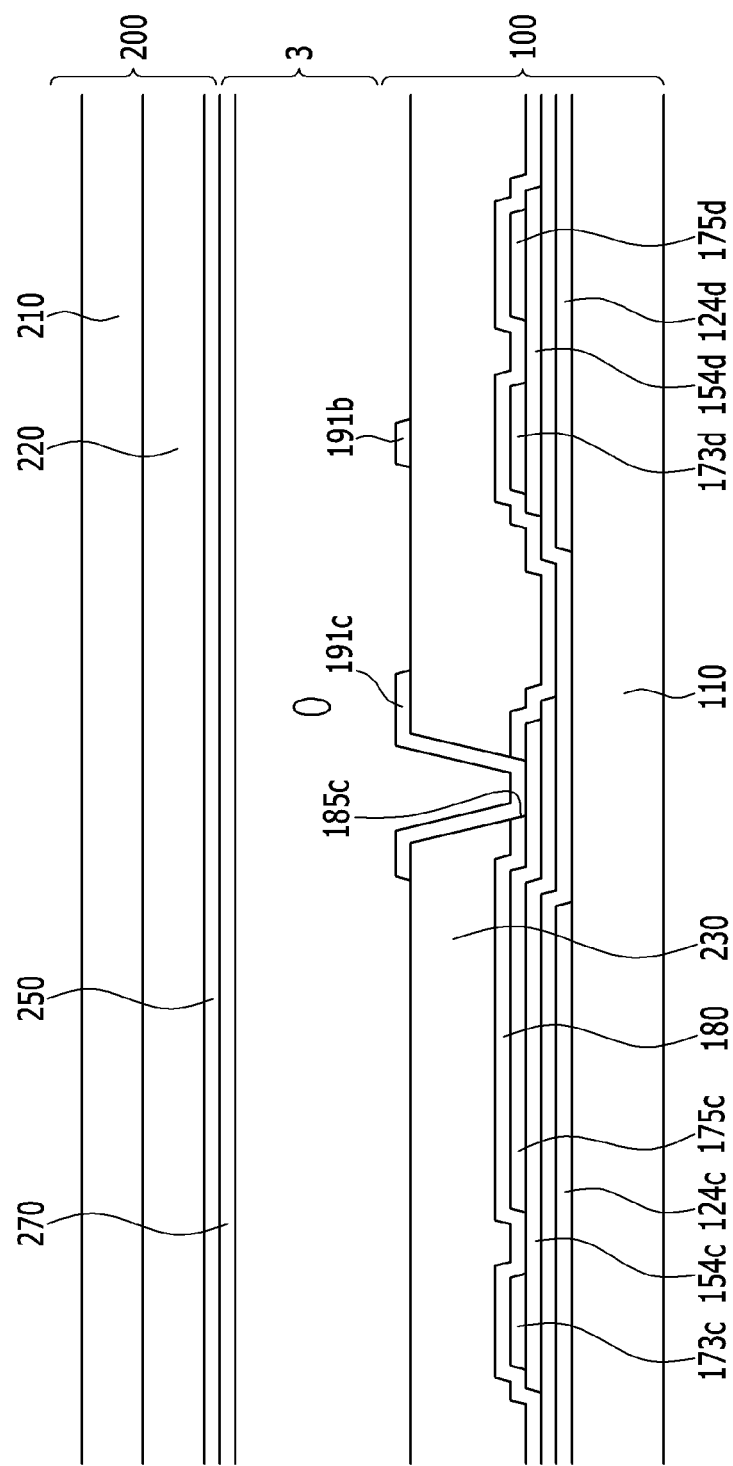
FIG. 7 is a cross-sectional view of a liquid crystal display, according to an exemplary embodiment of the present disclosure, taken along a line VII-VII of FIG. 3.

The structure of the liquid crystal display, according to an exemplary embodiment of the present disclosure, will be described with reference to FIGS. 3 to 7. FIG. 3 is a top plan view of a liquid crystal display, according to an exemplary embodiment of the present disclosure. FIG. 4 is a top plan view partially showing constituent elements of FIG. 3. FIG. 4 shows the first subpixel electrode, the second subpixel electrode, and the third subpixel electrode. FIG. 5 is a cross-sectional view of a liquid crystal display, according to an exemplary embodiment of the present disclosure, taken along a line V-V of FIG. 3. FIG. 6 is a cross-sectional view of a liquid crystal display, according to an exemplary embodiment of the present disclosure, taken along a line VI-VI of FIG. 3. FIG. 7 is a cross-sectional view of a liquid crystal display, according to an exemplary embodiment of the present disclosure, taken along a line VII-VII of FIG. 3.

The liquid crystal display, according to an exemplary embodiment of the present disclosure, includes a lower panel 100 and an upper panel 200 facing each other, and a liquid crystal layer 3 interposed between the lower panel 100 and the upper panel 200. A gate metal layer including a gate line 121, a first gate electrode 124a, a second gate electrode 124b, a third gate electrode 124c, and a fourth gate electrode 124d is formed on a first substrate 110 that is made of transparent glass or plastic.

The gate line 121 mainly extends in a horizontal direction and transfers a gate signal. The first gate electrode 124a, the second gate electrode 124b, and the third gate electrode 124c may have a shape protruded from the gate line 121. In one embodiment, the first gate electrode 124a, the second gate electrode 124b, and the third gate electrode 124c are protruded upwardly from the gate line 121 on a plane. The fourth gate electrode 124d may be positioned on the gate line 121. However, the shape of the first gate electrode 124a, the second gate electrode 124b, the third gate electrode 124c, and the fourth gate electrode 124d may be variously changed without deviating from the scope of the present disclosure. The first gate electrode 124a, the second gate electrode 124b, the third gate electrode 124c, and the fourth gate electrode 124d are connected to the same gate line 121, thereby receiving the same gate signal.

A first storage electrode line 131 is formed on the first substrate 110. The first storage electrode line 131 may be formed to be parallel to the gate line 121. The first storage electrode line 131 may be formed in the same layer as the gate line 121. A storage electrode 133 protruded from the first storage electrode line 131 is formed. The first storage electrode line 131 and the storage electrode 133 that overlap a first subpixel electrode 191a will be described later.

The first storage electrode line 131 is alternately applied with the first voltage and the second voltage as described above. The second voltage is higher than the first voltage, and after the gate-on voltage is applied to the gate line 121, the first storage electrode line 131 is applied with the second voltage.

A gate insulating layer 140 is formed on the gate line 121, the first gate electrode 124a, the second gate electrode 124b, the third gate electrode 124c, the first storage electrode line 131, and the storage electrode 133. The gate insulating layer 140 may be formed of an inorganic insulating material such as a silicon nitride (SiNx) or a silicon oxide (SiOx). Also, the gate insulating layer 140 may be made of a single layer or a multilayer.

A first semiconductor 154a, a second semiconductor 154b, a third semiconductor 154c, and a fourth semiconductor 154d are formed on the gate insulating layer 140. The first semiconductor 154a may be positioned on the first gate electrode 124a, the second semiconductor 154b may be positioned on the second gate electrode 124b, the third semiconductor 154c may be positioned on the third gate electrode 124c, and the fourth semiconductor 154d may be positioned on the fourth gate electrode 124d. The first semiconductor 154a, the second semiconductor 154b, the third semiconductor 154c, and the fourth semiconductor 154d may be made of amorphous silicon, polycrystalline silicon, or a metal oxide.

Although not shown, an ohmic contact may be further positioned on the first semiconductor 154a, the second semiconductor 154b, the third semiconductor 154c, and the fourth semiconductor 154d. The ohmic contact may be made of a silicide or a material such as n+ hydrogenated amorphous silicon in which an n-type impurity is doped with a high concentration.

A data metal layer including a second storage electrode line 177, a data line 171, a first source electrode 173a, a first drain electrode 175a, a second source electrode 173b, a second drain electrode 175b, a third source electrode 173c, a third drain electrode 175c, a fourth source electrode 173d, and a fourth drain electrode 175d is formed on the first semiconductor 154a, the second semiconductor 154b, the third semiconductor 154c, the fourth semiconductor 154d, and the gate insulating layer 140. As shown, the first semiconductor 154a, the second semiconductor 154b, the third semiconductor 154c, and the fourth semiconductor 154d may be formed under the second storage electrode line 177 or the data line 171. However, the present disclosure is no limited thereto, and first semiconductor 154a, the second semiconductor 154b, the third semiconductor 154c, and the fourth semiconductor 154d may not be formed under the second storage electrode line 177 and the data line 171.

The second storage electrode line 177 transmits a predetermined voltage and mainly extends in a vertical direction, thereby crossing the gate line 121 and the first storage electrode line 131. The second storage electrode line 177 may be formed in the vertical direction at a center portion of each of the subpixels PXa, PXb, and PXc. The second storage electrode line 177 is formed to bypass an edge in the region between the first subpixel electrode 191a and the second subpixel electrode 191b.

The data line 171 transmits the data signal and mainly extends in the vertical direction, thereby crossing the gate line 121 and the first storage electrode line 131. The data line 171 is formed in the direction approximately parallel to the second storage electrode line 177, and is formed with the same layer as the second storage electrode line 177.

The first source electrode 173a is formed to be protruded from the data line 171 on the first gate electrode 124a. The first source electrode 173a may have a shape that is bent in a "C" shape on the first gate electrode 124a. The first drain electrode 175a is formed to be separated from the first source electrode 173a on the first gate electrode 124a. A channel is formed in the first semiconductor 154a at a portion that is exposed between the first source electrode 173a and the first drain electrode 175a that are formed to be separated from each other.

The second source electrode 173b is formed to be protruded from the data line 171 on the second gate electrode 124b. The second source electrode 173b may have a shape that is bent in a "C" shape on the second gate electrode 124b. The second drain electrode 175b is formed to be separated from the second source electrode 173b on the second gate electrode 124b. A channel is formed in the second semiconductor 154b at a portion that is exposed between the second source electrode 173b and the second drain electrode 175b that are formed to be separated from each other.

The third source electrode 173c extends from the first source electrode 173a and is positioned on the third gate electrode 124c. The third source electrode 173c may have a shape that is bent in a "C" shape on the third gate electrode 124c. The third drain electrode 175c is formed to be separated from the third source electrode 173c on the third gate electrode 124c. A channel is formed in the third semiconductor 154c at a portion exposed between the third source electrode 173c and the third drain electrode 175c that are formed to be separated from each other.

The fourth source electrode 173d is connected to the third drain electrode 175c and is positioned on the fourth gate electrode 124d. The fourth source electrode 173d may be formed of a bar shape. The fourth drain electrode 175d is formed to be protruded from the second storage electrode line 177 on the fourth gate electrode 124d. The fourth drain electrode 175d is formed to be separated from the fourth source electrode 173d on the fourth gate electrode 124d. A channel is formed in the fourth semiconductor 154d at a portion exposed between the fourth source electrode 173d and the fourth drain electrode 175d that are formed to be separated from each other.

The first gate electrode 124a, the first semiconductor 154a, the first source electrode 173a, and the first drain electrode 175a form a first thin film transistor T1. The second gate electrode 124b, the second semiconductor 154b, the second source electrode 173b, and the second drain electrode 175b form a second thin film transistor T2. The third gate electrode 124c, the third semiconductor 154c, the third source electrode 173c, and the third drain electrode 175c form a third thin film transistor T3. The fourth gate electrode 124d, the fourth semiconductor 154d, the fourth source electrode 173d, and the fourth drain electrode 175d form a fourth thin film transistor T4.

A passivation layer 180 is formed on the second storage electrode line 177, the data line 171, the first source electrode 173a, the first drain electrode 175a, the second source electrode 173b, the second drain electrode 175b, the third source electrode 173c, the third drain electrode 175c, the fourth source electrode 173d, the fourth drain electrode 175d, and the gate insulating layer 140. The passivation layer 180 may be made of an inorganic insulating material or an organic insulating material.

A color filter 230 may be formed on the passivation layer 180. The color filter 230 may display one of primary colors such as red, green, and blue colors. Examples of the primary colors include red, green, and blue and yellow, cyan, and magenta. The color filter 230 may display a mixture of the primary colors or white as well as the primary colors. In the present exemplary embodiment, the color filter 230 is formed in the lower panel 100, however the present disclosure is not limited thereto, and the color filter 230 may be formed in the upper panel 200.

The passivation layer 180 and the color filter 230 have a first contact hole 185a exposing at least a portion of the first drain electrode 175a, a second contact hole 185b exposing at least a portion of the second drain electrode 175b, and a third contact hole 185c exposing at least a portion of the third drain electrode 175c. A first subpixel electrode 191a, a second subpixel electrode 191b, and a third subpixel electrode 191c are formed on the color filter 230. The first subpixel electrode 191a, the second subpixel electrode 191b, and the third subpixel electrode 191c may be formed of a transparent metal oxide such as indium-tin oxide (ITO) and indium-zinc oxide (IZO). The first subpixel electrode 191a is connected to the first drain electrode 175a through the first contact hole 185a. The second subpixel electrode 191b is connected to the second drain electrode 175b through the second contact hole 185b. The third subpixel electrode 191c is connected to the third drain electrode 175c through the third contact hole 185c.

The first subpixel electrode 191a, the second subpixel electrode 191b, and the third subpixel electrode 191c are applied with the data voltage through the first drain electrode 175a, the second drain electrode 175b, and the third drain electrode 175c. In this case, a portion of the data voltage applied to the third drain electrode 175c is divided through the third source electrode 173c such that the voltage applied to the third subpixel electrode 191c is lower than the voltage applied to the second subpixel electrode 191b. This is the case that the data voltage applied to the second subpixel electrode 191b and the third subpixel electrode 191c has a positive (+) polarity. I In contrast, in the case that the data voltage applied to the second subpixel electrode 191b and the third subpixel electrode 191c has a negative (−) polarity, the voltage applied to the second subpixel electrode 191b is lower than the voltage applied to the third subpixel electrode 191c.

The storage electrode 133 and the first subpixel electrode 191a overlap each other via the gate insulating layer 140 and the passivation layer 180, thereby forming the storage capacitor Cst_h. When the first storage electrode line 131 is applied with the second voltage, the voltage of the first subpixel electrode 191a is increased depending on the size of the storage capacitor Cst_h. Accordingly, the voltage applied to the first subpixel electrode 191a is higher than the voltage applied to the second subpixel electrode 191b.

An area of the second subpixel electrode 191b may be larger than one time to less than two times of an area of the first subpixel electrode 191a. An area of the third subpixel electrode 191c may be larger than one time to less than two times of the area of the second subpixel electrode 191b.

The first subpixel electrode 191a and the second subpixel electrode 191b are adjacent in the column direction, and the second subpixel electrode 191b and the third subpixel electrode 191c are adjacent in the column direction. The first thin film transistor T1, the second thin film transistor T2, and the third thin film transistor T3 are positioned between the first subpixel electrode 191a and the second subpixel electrode 191b.

The shape of the first subpixel electrode 191a is a quadrangle, and includes a cross-shaped step made of a transverse stem 192a and a longitudinal stem 193a. The first subpixel electrode 191a is divided into four sub-regions by the transverse stem 192a and the longitudinal stem 193a, and a plurality of minute branches 194a are formed in each sub-region.

The minute branches 194a of a first sub-region among the minute branches 194a positioned in the four sub-regions obliquely extend in the left-upper direction from the transverse stem 192a or the longitudinal stem 193a. The minute branches 194a of a second sub-region obliquely extend in the right-upper direction from the transverse stem 192a or the longitudinal stem 193a. Also, the minute branches 194a of a third sub-region obliquely extend in the right-lower direction from the transverse stem 192a or the longitudinal stem 193a, and the minute branches 194a of a fourth sub-region obliquely extend in the right-lower direction from the transverse stem 192a or the longitudinal stem 193a.

The shape of the second subpixel electrode 191b includes two quadrangles. The second subpixel electrode 191b is divided into a first part 191b1 and a second part 191b2 via the second storage electrode line 177. The first part 191b1 and the second part 191b2 of the second subpixel electrode 191b may be symmetrical with respect to the second storage electrode line 177.

The first part 191b1 and the second part 191b2 of the second subpixel electrode 191b include transverse stems 192b1 and 192b2, and outer stems 195b1 and 195b2. The second subpixel electrode 191b is divided into four sub-regions by the transverse stems 192b1 and 191b2 and the second storage electrode line 177, and each sub-region includes a plurality of minute branches 194b1 and 194b2. The minute branches 194b1 and 194b2 extend from the transverse stems 192b1 and 192b2 and the outer stems 195b1 and 195b2. The minute branches 194a positioned at four sub-regions extend in different directions.

The shape of the third subpixel electrode 191c is a quadrangle, and includes a crossed-shape stem made of a transverse stem 192c and a longitudinal stem 193c. The third subpixel electrode 191c is divided into four sub-regions by the transverse stem 192c and the longitudinal stem 193c, and each sub-region includes a plurality of minute branches 194c. The minute branches 194c extend from the transverse stem 192c and the longitudinal stem 193c. The minute branches 194c positioned in four sub-regions extend in different directions.

Each of the minute branches 194a, 194b, and 194c may form an angle of about 40 degrees to 45 degrees with the gate line 121 or the transverse stems 192a, 192b, and 192c. Also, the minute branches 194a, 194b, and 194c of two adjacent sub-regions may be crossed.

The second storage electrode line 177 may overlap the first subpixel electrode 191a and the third subpixel electrode 191c. Particularly, the second storage electrode line 177 may overlap the longitudinal stem 193a of the first subpixel electrode 191a and may overlap the longitudinal stem 193c of the third subpixel electrode 191c. The second storage electrode line 177 may not overlap the second subpixel electrode 191b.

Next, the upper panel 200 will be described. A light blocking member 220 is formed on a second substrate 210 that is made of transparent glass or plastic. The light blocking member 220 is also referred to as a black matrix as it prevents light leakage. The light blocking member 220 may overlap the gate line 121, the data line 171, the first thin film transistor T1, the second thin film transistor T2, the third thin film transistor T3, the fourth thin film transistor T4, the first contact hole 185a, the second contact hole 185b, and the third contact hole 185c.

An overcoat 250 may be formed on the light blocking member 220, and a common electrode 270 is formed on the overcoat 250. The light blocking member 220 and the common electrode 270 are formed in the upper panel 200, however the present disclosure is not limited thereto. The light blocking member 220 and the common electrode 270 may be formed in the lower panel 100.

The liquid crystal layer 3 is positioned between the lower panel 100 and the upper panel 200. The liquid crystal layer 3 may be made of liquid crystal molecules having negative dielectric anisotropy, and the liquid crystal molecules may be aligned in the direction perpendicular to the lower panel 100. That is, the vertical alignment may be realized.

Next, the liquid crystal display, according to an exemplary embodiment of the present disclosure, will be described with reference to FIG. 8 and FIG. 9.

Figure 8:
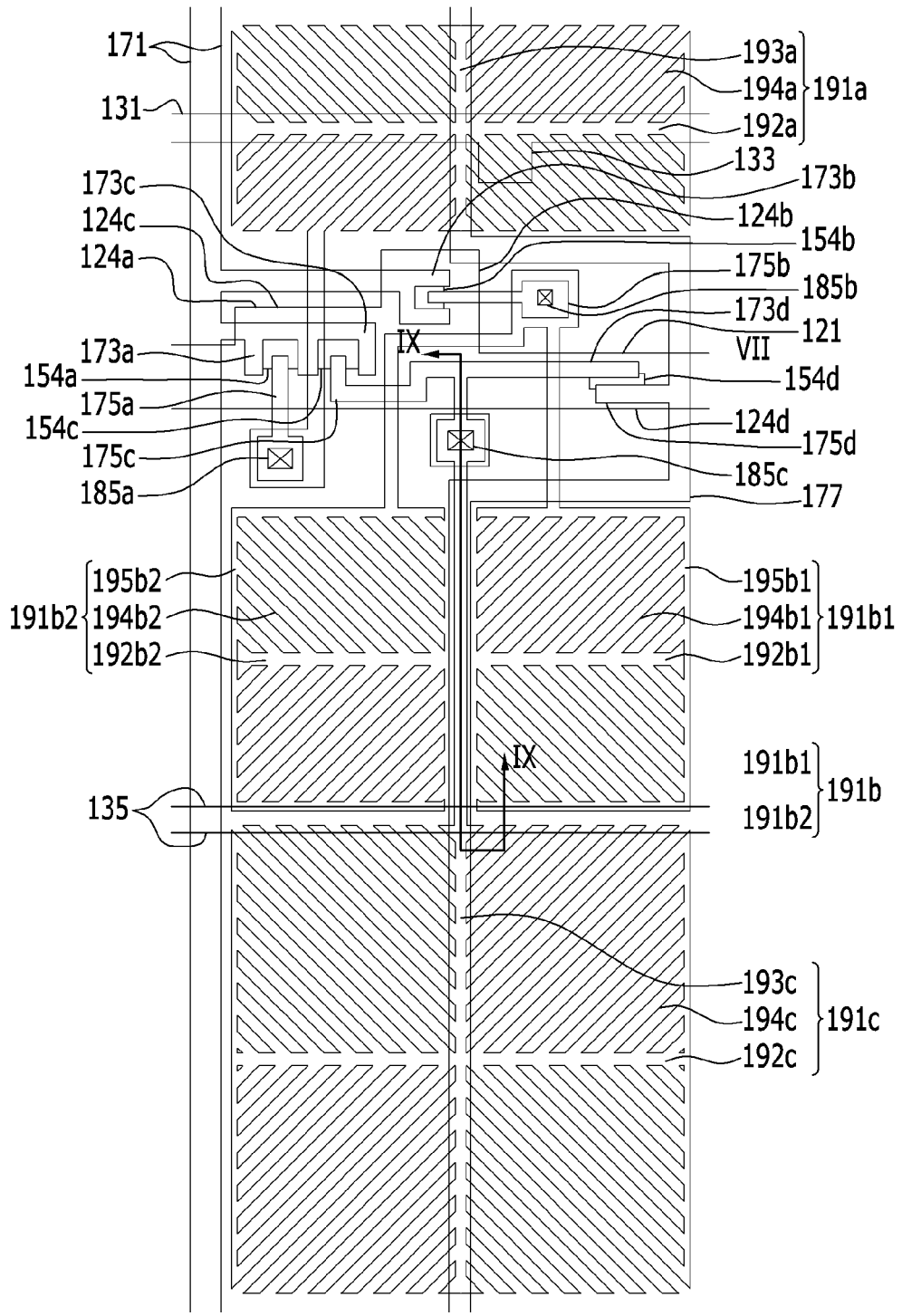
FIG. 8 is a top plan view of a liquid crystal display, according to an exemplary embodiment of the present disclosure.
Figure 9:
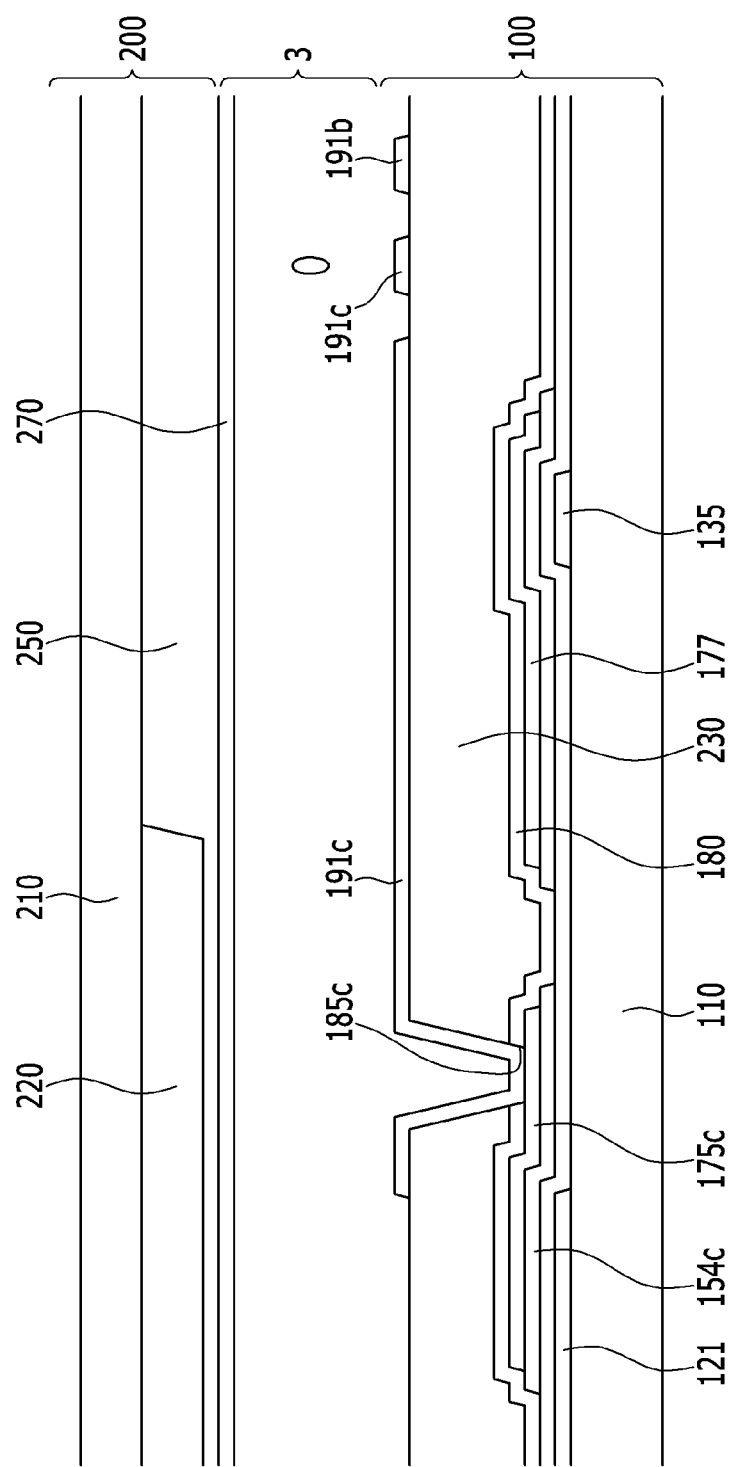
FIG. 9 is a cross-sectional view of a liquid crystal display, according to an exemplary embodiment of the present disclosure, taken along a line IX-IX of FIG. 8.

The liquid crystal display, according to an exemplary embodiment of the present disclosure shown in FIG. 8 and FIG. 9, is almost the same as the liquid crystal display according to the exemplary embodiment described with reference to FIG. 1 to FIG. 7, therefore the overlapped description is omitted. In the present exemplary embodiment, the light blocking member is formed between the second subpixel electrode and the third subpixel electrode, in a way that is different from the previous exemplary embodiment described with reference to FIG. 1 to FIG. 7.

FIG. 8 is a top plan view of a liquid crystal display, according to an exemplary embodiment of the present disclosure. FIG. 9 is a cross-sectional view of a liquid crystal display, according to an exemplary embodiment of the present disclosure, taken along a line IX-IX of FIG. 8.

Like the previous exemplary embodiment, the liquid crystal display includes a lower panel 100 and upper panel 200 facing each other, and a liquid crystal layer 3 interposed therebetween. In the lower panel 100, the gate line 121 and the data line 171 crossing to each other are formed on the first substrate 110 at different layers. The first subpixel electrode 191a, the second subpixel electrode 191b, and the third subpixel electrode 191c are disposed to be adjacent in the column direction. The first thin film transistor T1, the second thin film transistor T2, and the third thin film transistor T3 are positioned between the first subpixel electrode 191a and the second subpixel electrode 191b, and the light blocking member 220 corresponding to the first subpixel electrode 191a and the second subpixel electrode 191b is formed on the second substrate 210. However, the light blocking member 220 is not formed at a portion corresponding to an area between the second subpixel electrode 191b and the third subpixel electrode 191c.

The inclination directions of the liquid crystal molecules are different with respect to a boundary portion between the second subpixel electrode 191b and the third subpixel electrode 191c. Accordingly, the inclination direction of the liquid crystal molecules positioned at the boundary portion between the second subpixel electrode 191b and the third subpixel electrode 191c is not clear, thereby textures due thereto may be generated. In the present exemplary embodiment, a first light blocking part 135 is formed at the boundary portion between the second subpixel electrode 191b and the third subpixel electrode 191c such that the texture is not recognized.

The first light blocking part 135 is positioned at the same layer as the gate line 121. The first light blocking part 135 is made of an opaque metal material, thereby preventing the light from passing between the second subpixel electrode 191b and the third subpixel electrode 191c. The first light blocking part 135 may cross the data line 171 and the second storage electrode line 177.

Figure 10:
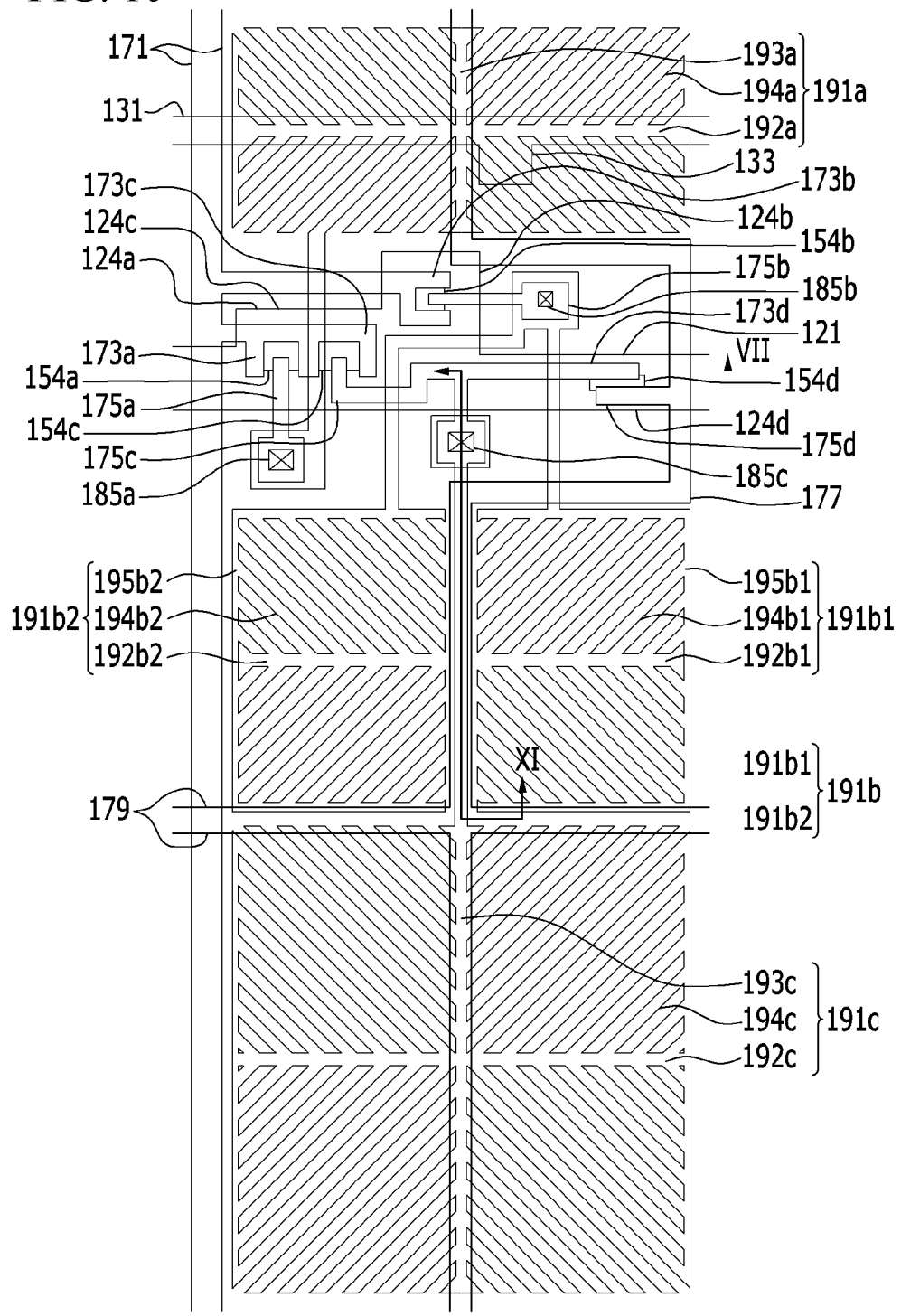
FIG. 10 is a top plan view of a liquid crystal display, according to an exemplary embodiment of the present disclosure.
Figure 11:
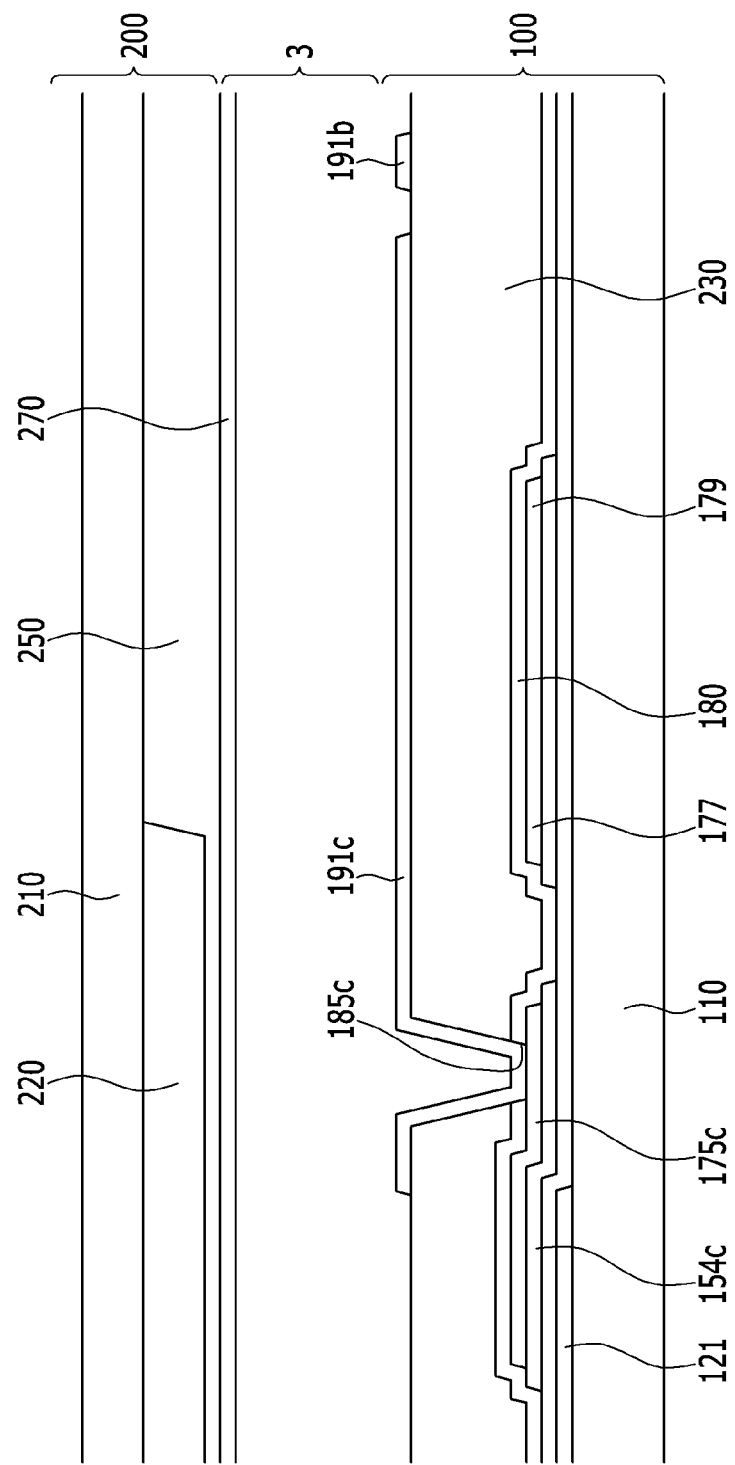
FIG. 11 is a cross-sectional view of a liquid crystal display, according to an exemplary embodiment of the present disclosure, taken along a line XI-XI of FIG. 10.

Next, the liquid crystal display, according to an exemplary embodiment of the present disclosure, will be described with reference to FIG. 10 and FIG. 11. The liquid crystal display, according to an exemplary embodiment of the present disclosure shown in FIG. 10 and FIG. 11 is almost the same as the liquid crystal display, according to the previous exemplary embodiment described with reference to FIG. 8 and FIG. 9, therefore the overlapped description is omitted. In the present exemplary embodiment, the light blocking member is formed in the same layer as the data line, in a way that is different from the previous exemplary embodiment described with reference to FIG. 8 and FIG. 9.

FIG. 10 is a top plan view of a liquid crystal display, according to an exemplary embodiment of the present disclosure. FIG. 11 is a cross-sectional view of a liquid crystal display, according to an exemplary embodiment of the present disclosure, taken along a line XI-XI of FIG. 10.

Like the previous exemplary embodiment, the liquid crystal display, according to an exemplary embodiment of the present disclosure, includes a lower panel 100 and upper panel 200 facing each other, and a liquid crystal layer 3 interposed therebetween. In the present exemplary embodiment, a second light blocking part 179 is formed at a boundary portion between the second subpixel electrode 191b and the third subpixel electrode 191c. The second light blocking part 179 is positioned at the same layer as the data line 171. The second light blocking part 179 is formed of an opaque metal material, thereby preventing the light from passing between the second subpixel electrode 191b and the third subpixel electrode 191c. The second light blocking part 179 may be connected to the second storage electrode line 177. However, the second light blocking part 179 is not connected to the data line 171.

While the present disclosure has been described in connection with what is presently considered to be practical exemplary embodiments, it is to be understood that the present disclosure is not limited to the disclosed embodiments, but, on the contrary, is intended to cover various modifications and equivalent arrangements included within the spirit and scope of the appended claims.

DESCRIPTION OF SYMBOLS

| | |
|---|---|
| 100: lower panel | 110: first substrate |
| 121: gate line | 131: first storage electrode line |
| 133: storage electrode | 135: first light blocking part |
| 171: data line | 177: second storage electrode line |
| 179: second light blocking part | 180: passivation layer |
| 191a: first subpixel electrode | 191b: second subpixel electrode |
| 191b1: first part of a second subpixel electrode | |
| 191b2: second part of a second subpixel electrode | |
| 191c: third subpixel electrode | 200: upper panel |
| 210: second substrate | 220: light blocking member |
| 230: color filter | 270: common electrode |

What is claimed is:
1. A liquid crystal display comprising:
a substrate;
a gate line, a data line, a first storage electrode line, and a second storage electrode line positioned on the substrate;
a first thin film transistor, a second thin film transistor, and a third thin film transistor connected to the gate line and the data line;
a fourth thin film transistor connected to the gate line, the third thin film transistor, and the second storage electrode line;
a first subpixel electrode connected to the first thin film transistor;
a second subpixel electrode connected to the second thin film transistor;
a third subpixel electrode connected to the third thin film transistor; and
a storage electrode connected to the first storage electrode line and overlapping the first subpixel electrode,
wherein the first subpixel electrode includes a crossed-shape stem including a transverse stem and a longitudinal stem, and a minute branch extending from the crossed-shape stem, and
the first storage electrode line overlaps the transverse stem of the first subpixel electrode.
2. The liquid crystal display of claim 1, wherein
a first data voltage applied to the first subpixel electrode is higher than a second data voltage applied to the second subpixel electrode, and
the second data voltage applied to the second subpixel electrode is higher than a third data voltage applied to the third subpixel electrode.

3. The liquid crystal display of claim 1, wherein
the first storage electrode line is alternately applied with a first voltage and a second voltage higher than the first voltage.

4. The liquid crystal display of claim 3, wherein
after the gate line is applied with a gate-on voltage, the first storage electrode line is applied with the second voltage.

5. The liquid crystal display of claim 3, wherein
when the first storage electrode line is applied with the second voltage, the first data voltage applied to the first subpixel electrode is increased.

6. The liquid crystal display of claim 1, wherein
the second storage electrode line is applied with a constant voltage.

7. The liquid crystal display of claim 1, wherein
the gate line and the data line are formed at different layers and are crossed.

8. The liquid crystal display of claim 7, wherein
the first storage electrode line is positioned at a same layer as the gate line.

9. The liquid crystal display of claim 8, wherein
the first storage electrode line extends in a direction parallel to the gate line.

10. The liquid crystal display of claim 7, wherein
the second storage electrode line is positioned at a same layer as the data line.

11. The liquid crystal display of claim 10, wherein
the second storage electrode line extends in a direction parallel to the data line.

12. The liquid crystal display of claim 11, wherein
the second storage electrode line does not overlap the second subpixel electrode.

13. The liquid crystal display of claim 1, wherein
the second subpixel electrode includes a first part and a second part respectively positioned at both sides with respect to the second storage electrode line.

14. The liquid crystal display of claim 13, wherein
the first part and the second part of the second subpixel electrode respectively include:
a transverse stem;
an outer stem; and
a minute branch extending from the transverse stem and the outer stem.

15. The liquid crystal display of claim 13, wherein
the first part and the second part are symmetrical with respect to the second storage electrode line.

16. The liquid crystal display of claim 1, further comprising
a light blocking member positioned between the second subpixel electrode and the third subpixel electrode,
wherein the light blocking member is positioned at a same layer as the gate line.

17. The liquid crystal display of claim 1, further comprising
a light blocking member positioned between the second subpixel electrode and the third subpixel electrode,
wherein the light blocking member is positioned at a same layer as the data line and is connected to the second storage electrode line.

18. A liquid crystal display comprising:
a substrate;
a gate line, a data line, a first storage electrode line, and a second storage electrode line positioned on the substrate;
a first thin film transistor, a second thin film transistor, and a third thin film transistor connected to the gate line and the data line;
a fourth thin film transistor connected to the gate line, the third thin film transistor, and the second storage electrode line;
a first subpixel electrode connected to the first thin film transistor;
a second subpixel electrode connected to the second thin film transistor;
a third subpixel electrode connected to the third thin film transistor; and
a storage electrode connected to the first storage electrode line and overlapping the first subpixel electrode,
wherein the first subpixel electrode includes:
a crossed-shaped stem including a transverse stem and a longitudinal stem, and;
a minute branch extending from the crossed-shape stem,
wherein the second storage electrode line overlaps the longitudinal stem of the first subpixel electrode.

19. A liquid crystal display comprising:
a substrate;
a gate line, a data line, a first storage electrode line, and a second storage electrode line positioned on the substrate;
a first thin film transistor, a second thin film transistor, and a third thin film transistor connected to the gate line and the data line;
a fourth thin film transistor connected to the gate line, the third thin film transistor, and the second storage electrode line;
a first subpixel electrode connected to the first thin film transistor;
a second subpixel electrode connected to the second thin film transistor;
a third subpixel electrode connected to the third thin film transistor; and
a storage electrode connected to the first storage electrode line and overlapping the first subpixel electrode,
wherein the third subpixel electrode includes a crossed-shape stem including a transverse stem and a longitudinal stem, and a minute branch extending from the crossed-shape stem, and
the second storage electrode line overlaps the longitudinal stem of the third subpixel electrode.

20. The liquid crystal display of claim 19, wherein
the second storage electrode line bypasses an edge in a region between the first subpixel electrode and the second subpixel electrode.

* * * * *